United States Patent [19]

Kahn

[11] 3,908,090

[45] Sept. 23, 1975

[54] COMPATIBLE AM STEREOPHONIC TRANSMISSION SYSTEM

[76] Inventor: Leonard R. Kahn, 70 N. Grove, Freeport, L.I., N.Y. 11520

[22] Filed: July 10, 1974

[21] Appl. No.: 487,155

Related U.S. Application Data

[63] Continuation-in-part of Ser. No. 251,947, May 10, 1972, abandoned.

[52] U.S. Cl. .............................. 179/15 BT; 325/59

[51] Int. Cl. .............................................. H04h 5/00

[58] Field of Search ............ 179/15 BT; 325/36, 59, 325/60, 139

[56] References Cited

UNITED STATES PATENTS

| | | | |
|---|---|---|---|
| 3,167,614 | 1/1965 | Holt et al. | 179/15 BT |
| 3,218,393 | 11/1965 | Kahn | 325/36 |
| 3,350,645 | 10/1967 | Kahn | 325/137 |

*Primary Examiner*—Kathleen H. Claffy
*Assistant Examiner*—Thomas D'Amico
*Attorney, Agent, or Firm*—Graybeal, Barnard, Uhlir & Hughes

[57] ABSTRACT

Amplitude modulation (AM) stereophonic transmission system characterized by the modulation of a radiant energy carrier wave with two stereo related signals, each appearing as a first order single-sideband, the carrier wave being preferably also modulated with an infrasonic frequency (e.g. 15 Hz) signal indicating stereo signal presence (with such infrasonic frequency modulation being either amplitude modulated or phase modulated).

As an improvement of the AM stereo transmission technique disclosed in my U.S. Pat. No. 3,218,393 the present system develops a carrier modulated with stereo related (L and R) audio signal intelligence by amplitude modulating the carrier with the summation (L + R) signal and phase modulating the carrier with an altered stereo difference (L-R) signal, the altered difference signal being developed by combining the fundamental of the difference (L-R) signal with the difference signal derived from frequency doubled L and R signals, the amplitude level of the frequency doubled difference signal being about 13% of the amplitude level of the fundamental difference signal at full stereo modulation and being a square law function of the stereo difference signal level. In the preferred embodiment the frequency doublers are of the constant gain type and the level of the second harmonic phase modulation is determined by a level squarer type circuit.

19 Claims, 4 Drawing Figures

COMPATIBLE AM STEREOPHONIC TRANSMISSION SYSTEM

CROSS REFERENCES TO RELATED APPLICATIONS

This application is a continuation-in-part of my copending and now abandoned application Ser. No. 251,947 entitled AM Stereophonic Transmission and Reception System, and Methods and Components Utilized Therein, filed May 10, 1972. My related application Ser. No. 487,154 entitled Compatible AM Stereophonic Receivers Involving Sideband Separation At IF Frequency, filed July 10, 1974 also as a continuation-in-part of said application Ser. No. 251,947 in general relates to specialized receivers for reception of a compatible AM stereo signal such as developed and transmitted by the system disclosed and claimed herein.

BACKGROUND OF THE INVENTION

1. Field of the Invention

This invention relates to compatible AM stereo transmission techniques, including the basic proposition of modulating a carrier wave so that the stereo related intelligence appears as respective upper and lower sidebands of the carrier wave in the manner fundamentally shown in my prior art U.S. Pat. No. 3,218,393, with optional provision for the presence of infrasonic frequency (e.g. 15 Hz) modulation of the carrier wave to provide in the receiver indication of the presence of a stereo modulated signal for tuning and for receiver mode control purposes.

2. Description of the Prior Art

Compatible stereophonic AM transmission and reception, involving stereo related upper and lower sidebands, with the difference stereo signal (L-R) phase modulating the carrier wave and with the summation stereo signal (L+R) envelope modulating the carrier wave, are disclosed in my U.S. Pat. No. 3,218,393, together with certain forms of receivers for stereophonic reception of a carrier wave so modulated. A further discussion of this compatible AM stereophonic modulation technique appears in my paper entitled "A Stereophonic System For Amplitude Modulated Broadcast Stations", which appears in IEEE Transactions on Broadcasting, Vol. BC-17, NO. 2, June 1971, at pages 50–55. To the extent here relevant, the disclosures of this prior patent and this paper are incorporated herein by reference.

For a fuller understanding of the manner of stereophonic modulation characteristic of the present invention, as hereinafter more fully discussed, reference can be had to my U.S. Pat. No. 3,350,645, relating to a similar technique for compatible single-sideband modulation, wherein the second order sideband rendering the single-sideband modulation compatibly receivable by conventional envelope detection receivers is developed by signal splitting, phase shifting, signal segment frequency doubling and signal combining circuitry.

Also known are stereophonic transmission and reception systems as disclosed in Shoaf U.S. Pat. No. 3,009,151, involving a two-channel FM - AM stereo system wherein stereo related signals are respectively frequency modulated and amplitude modulated on FM band and AM band carrier waves; Colodny U.S. Pat. No. 3,031,529, disclosing a single channel AM stereo system employing synchronous detectors in the receiver portion of the system; Avins U.S. Pat. No.

3,068,475, disclosing a stereo transmission and reception system wherein one stereo related signal is amplitude modulated on a carrier wave and the other stereo related signal is frequency modulated on the same carrier wave; Barton U.S. Pat. No. 3,102,167, disclosing a two-channel, phase-shifted, double sideband stereo transmission; Fink U.S. Pat. No. 3,206,550, disclosing visual display of a stereo presence signal; Holt et al. U.S. Pat. No. 3,167,614, disclosing use of an infrasonic tone to indicate stereo signal presence in an AM/PM type transmission' system; and Collins U.S. Pat. No. 3,231,672, disclosing an AM stereo system involving linearly added carrier waves at the same frequency but in different phase, with each of the carrier waves amplitude modulated with stereo related signals.

Also known in a system for transmission of stereophonic signals over telephone lines, as in Almering et al. U.S. Pat. No. 3,803,490, granted June 3, 1974, wherein two different carrier frequencies are employed with a relatively wide bandwidth requirement (e.g. 65 kHz to 103 kHz with 8.06 kHz break), and with no attempt to make the system compatible from the point of view of detection of signals by envelope detection means.

Also notable as being of general interest, in the field of CSSB and stereophonic signal transmission are the following:

E. S. Purington, U.S. Pat. No. 2,020,327 Nov. 12, 1935.

O. G. Villard, Jr., "Composite amplitude and phase Modulation", Electronics, Vol. 21, Nov. 1948, pp. 86–89.

L. R. Kahn, "Comparison of Linear Single-Sideband Transmitters With Envelope Elimination and Restoration Single-Sideband Transmitters", Proc. IRE, Vol. 44, December 1956, pp. 1706–1712.

J. Avins, et al, "Compatible Stereophonic System for the A.M. Broadcast Band", RCA Review, September 1960, pp. 299–359.

H. E. Sweeney and C. W. Baugh, Jr., U.S. Pat. No. 3,069,679, Dec. 18, 1962.

Philco Corporation, "Petition to the FCC For The Institution of Rule Making Proceedings Looking Toward the Adoption of Compatible AM Stereo Transmission Standards", filed Dec. 4, 1958.

J. M. Hollywood and M. Kronenberg, "A Stereophonic Transmission System for AM Broadcasting", Journal of the Audio Engineering Society, Vol. 9, No. 2, April 1961.

D. Gabor, "Theory of Communication", Proc. Inst. Elec. Eng., Vol. 93, 1946, pp. 429–457.

E. Bedrosian, "The Analytic Signal Representation of Modulated Waveforms", Proc. IRE, Vol. 50, Oct. 1962, pp. 2071–2076.

W. L. Rubin and J. V. DiFranco, "Analytic Representations of Wide-band Ratio Frequency Signals", J. Franklin Inst., Vol. 275, Mar. 1963, pp. 197–204.

H. B. Voelcker, "Toward a Unified Theory of Modulation-Part I: Phase-envelope Relationships", Proc. IEEE, Vol. 54, Mar. 1966, pp. 340–353.

R. E. Bogner, "Frequency Sampling Filters - Hilbert Transformers and Resonators", Bell Syst. Tech. J., Vol. 48, Mar. 1969, pp. 501–510.

E. C. Titchmarsh, Introduction to the Theory of Fourier Integrals. New York: Oxford, 1937.

M. Schwartz, W. R. Bennett, and S. Stein, Communication Systems and Techniques. New York: McGraw-Hill, 1966.

A. Papoulis, The Fourier Integral and Its Applications. New York, McGraw-Hill, 1962.

H. E. Rowe, Signals and Noise in Communication Systems. Princeton, New Jersey: Van Nostrand, 1965.

L. R. Kahn, "Compatible Single-Sideband", Proc. IRE Vol. 49, Oct. 1961, pp. 1503–1527.

SUMMARY OF THE INVENTION

Characteristic advantages and features of the AM stereophonic transmission system of the present invention includes modulation of the carrier with an infrasonic frequency utilized in the receiver to indicate stereo signal presence and provide automatic shifting of the reception mode to and from stereophonic and monophonic and/or to provide a carrier tuning indicator. Also an important characteristic and feature of the present invention is the presentation of an AM stereophonic transmission system which is fully compatible with existing equipment in the sense of being receivable by conventional AM envelope detection type receivers, either by a single such receiver in which case the reception is of the monophonic mode and without signal distortion, or by two conventional AM type envelope detector receivers, each slightly off-tuned respectively above and below the carrier frequency, in which event the reception is of the stereophonic mode or the monophonic mode depending upon the nature of the transmitted signal.

A further important characteristic and feature of the present invention is the development of a compatible AM stereo transmitted signal by means controlling the phase modulation component in a manner realizing minimal signal distortion in transmission and reception of the signal, such phase modulation component being a composite of the fundamental and the second harmonic of the stereo difference signal with such second harmonic component being developed through constant gain frequency doubler means and with the level thereof being controlled in a level squarer circuit responsive to the syllabic level of the fundamental stereo difference signal, the level of the stereo difference second harmonic signal being a square law function of the level of the fundamental stereo difference signal and being maintained at about 13% of the fundamental level at full stereo modulation to minimize out-of-band radiation.

Other features and advantages of the invention will be apparent from the following description and discussion of certain typical embodiments of the invention.

BRIEF DESCRIPTION OF THE DRAWINGS

FIG. 3(A) portraying the Bessel function distribution for 0.5 radian phase modulation (full stereo modulation of the fundamental stereo difference signal); FIG. 3(B) showing the second harmonic phase modulation spectrum (at 0.0665 radian); and FIG. 3(C) showing the combined PM component spectrum distribution;

DESCRIPTION OF THE PREFERRED EMBODIMENT

Figures 1, 2:
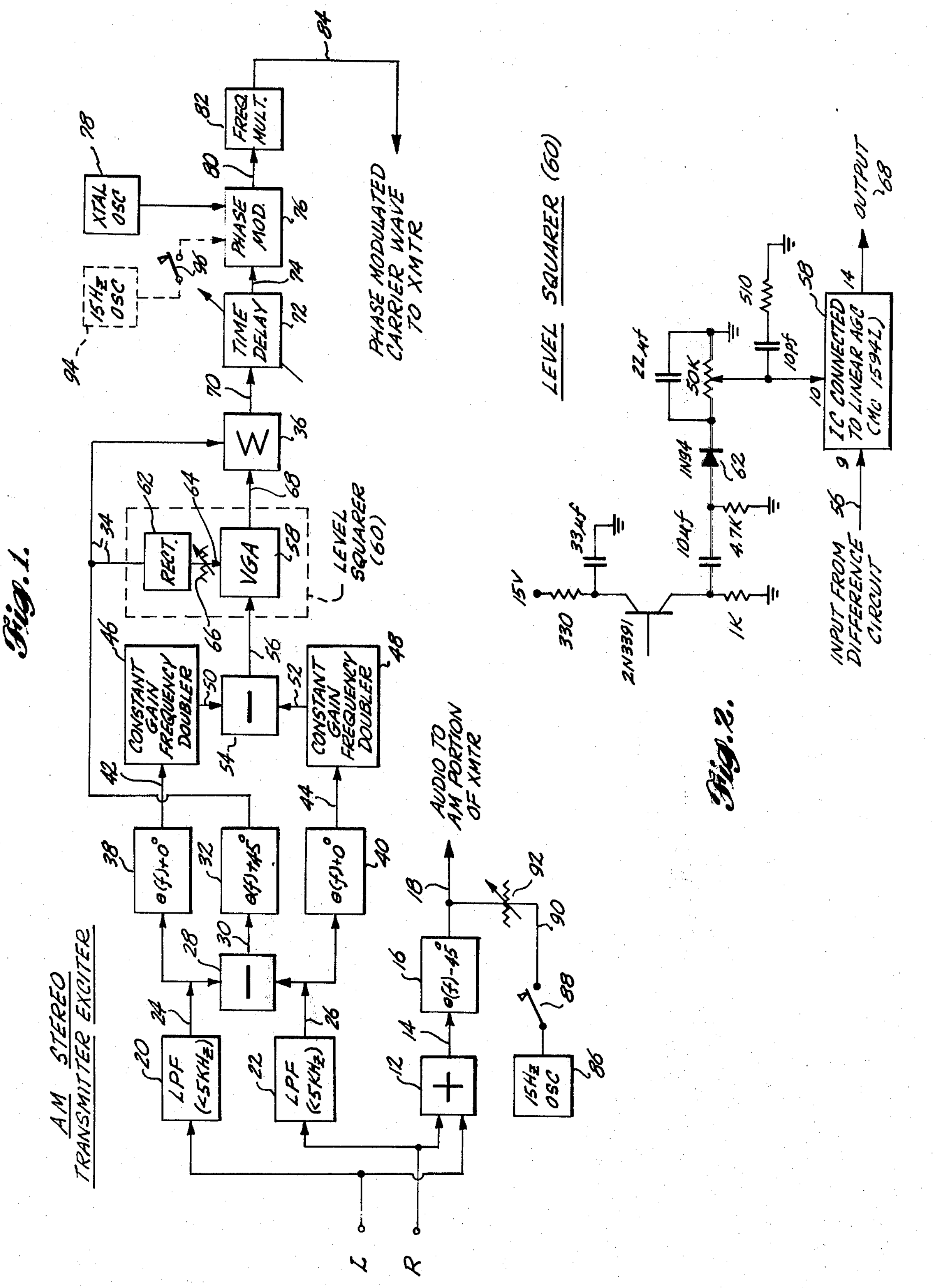
FIG. 1 is a simplified block diagram of a transmitter exciter developing amplitude modulated and phase modulated inputs to the modulation stages of a conventional or standard AM transmitter such as shown in FIG. 1 of my U.S. Pat. No. 3,218,393.
FIG. 2 is a showing, partly in schematic and partly in block form, of the level squarer circuit portion of the transmitter exciter presented in FIG. 1.

FIG. 1 illustrates in block diagram form a typical transmitter exciter layout embodying the present invention. Stereo related audio input signals L and R, derived in a manner known per se, are fed to a summation circuit 12, the summation output 14 from which is applied to phase shift network 16 (a −45° phase difference network; compare network 70 in my Pat. No. 3,218,393) and its output 18 is in turn utilized as the audio input to the AM portion of the associated AM transmitter. To this extent, the development of the AM modulation of the transmitted signal is identical to the AM modulation provided by the transmitter exciter or adapter shown in FIG. 2 of my prior U.S. Pat. No. 3,218,393.

To develop the phase modulation component applied to the phase modulator portion of the transmitter, the audio input signals L and R are also fed through respective low pass filters 20 and 22, the respective outputs 24, 26 from which are fed to difference circuit 28. The output 30 from difference circuit 28, after undergoing a relative +45° phase shift in phase difference network 32 (compare network 72 in my Pat. No. 3,218,393), serves as the fundamental phase modulation component input 34 fed to summation circuit 36.

Figure 3:
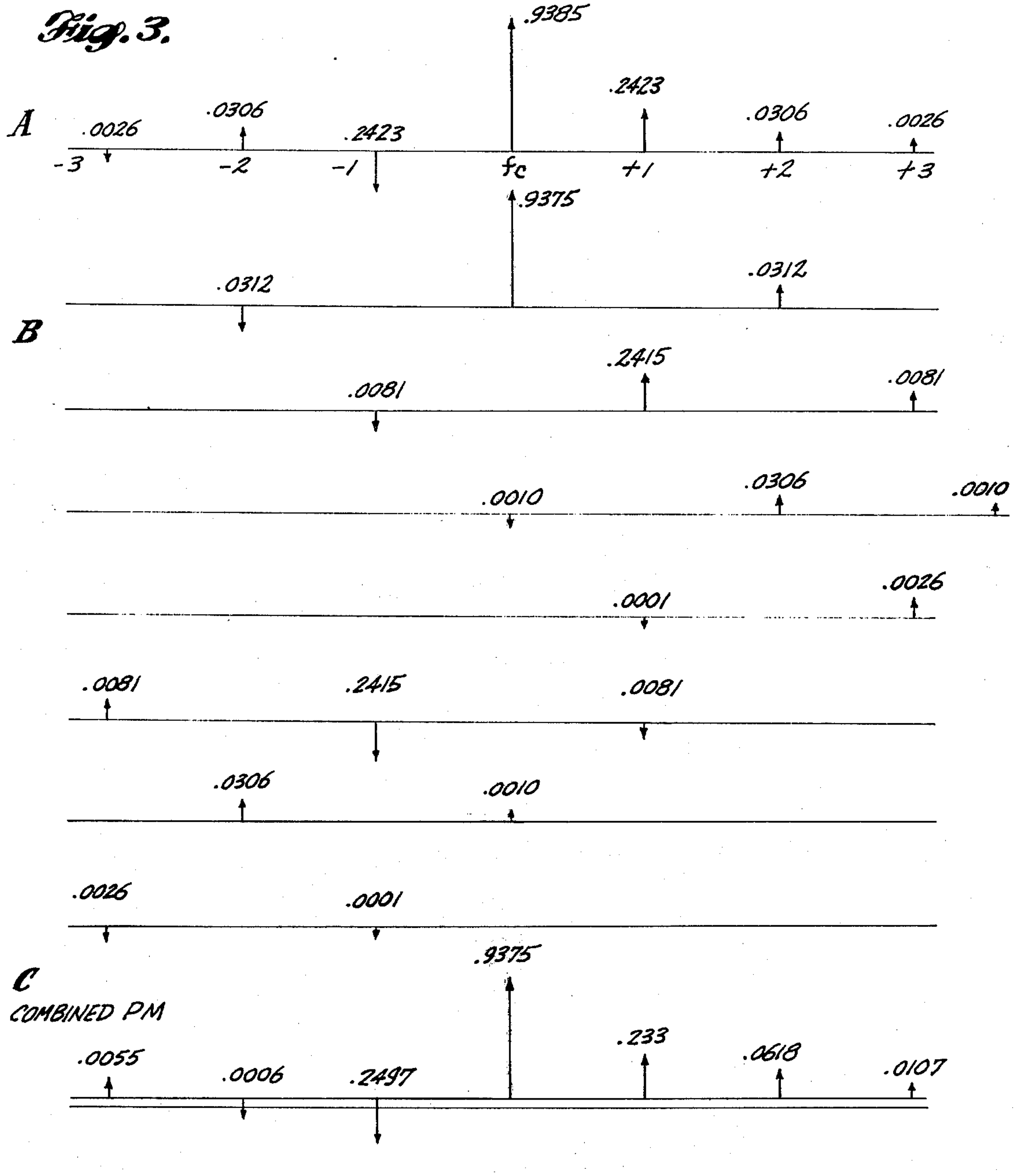
FIGS. 3(A), 3(B) and 3(C) compositely and diagrammatically present the frequency spectra of the PM modulating component with only the lower sideband (LSB) active and fully modulated.

The outputs 24, 26 from their respective low pass filters 20, 22 are also fed to separate phase difference networks 38, 40 with zero relative phase shift. Respective network outputs 42, 44 are applied to respective constant gain frequency doublers 46, 48. Suitable, each of the constant gain frequency doublers 46, 48 can be the same type of doubler circuit as shown in FIG. 3 of my U.S. Pat. No. 3,350,645, with the doubler circuit in this instance operated at relatively high levels, e.g. on the order of a volt or more, so that the gain of the doubler is not a function of the input level over its normal operating range. In the operation of the circuit shown in said Pat. No. 3,350,645 the circuit is operated at relatively low level so that the rectifier output curve in nonlinear and the output second harmonic followed approximately a square law. In the instance of the present constant gain frequency doublers 46, 48, the input level is sufficient (on the order of 2 volts or more) so that, although the different circuit provides a second harmonic, the amplitude of the second harmonic is a linear function of the input level.

The respective outputs 50, 52 of the doubler circuits 46, 48 are fed to difference circuit 54, the frequency doubled difference signal output 56 from which is the signal input to the variable gain amplifier 58 of level squarer circuit 60. The level squarer 60 circuit, a typical schematic of which is shown at FIG. 2, also comprises rectifier 62 controlled by fundamental component input 34 and in turn providing a variable output 64 (the average level of which is set by potentiometer 66) which in turn controls the gain of the variable gain amplifier 58. As shown in FIG. 2, the time constants of the circuitry associated with the rectifier 62 are suitably selected so that the variable gain amplifier 58 gain is controlled at a syllabic rate, i.e. at a rate comparable to the syllabic rate of speech (e.g. by use of time constants on the order of 0.1 second).

As indicated in FIG. 2, the level squarer circuit which functions to develop the proper level of second harmonic difference signal input for the phase modulation suitably employs a Motorola integrated circuit (IC) type MC1594L, connected as a wideband amplifier with linear AGC as shown at FIG. 24 at page MC1594-Pg. 12 of the Motorola Linear Integrated Circuits Data Book dated December 1971.

As indicated, control of the rectifier 62 is derived from the fundamental difference signal input 34 (the phase shifted output 30 of difference circuit 28). Thus, when the L and R signals are equal and in phase (i.e. the audio signal intelligence input is monophonic), the L—R signal is zero and the rectifier 62 reduces the gain of the variable gain amplifier 58 to zero (it being notable that the input to the variable gain amplifier 58 under this condition is also zero). However, when the L signal is at full level and the R signal is zero (representing an idealized stereophonic signal input condition), the rectifier 62 controls the gain of variable gain amplifier 58 to be at a given, maximal level (i.e. a gain of X). When the L and R signals are both present and are in phase but the L signal is at full amplitude and the R signal is at one-half amplitude, for example, the gain of the variable gain amplifier 58 is reduced (i.e. to X/2) to provide the right amount of second harmonic component. The second harmonic component output 68 from the variable gain amplifier 58 is applied as an input to summation circuit 36 along with the fundamental difference signal component 34, and the summated output 70, with appropriate time delay in variable time delay circuit 72, constitutes the altered stereo difference signal input 74 applied to the phase modulator 76 wherein the audio input 74 phase modulates the carrier wave input from high frequency crystal oscillator 78, with the output 80 from the phase modulator 76, after appropriate frequency multiplication in multiplier 82 as desired, providing output 84 which is employed as the phase modulated carrier wave in the associated AM transmitter in like manner as the phase modulated RF output 42 in the stereo adapter or exciter shown in FIGS. 1 and 2 of my U.S. Pat. No. 3,218,393.

In general, and as discussed in more detail in connection with the discussion of FIGS. 3 and 4 hereof as set forth below, the level squarer 60 circuit functions to provide a second harmonic component input 68 at a level which is a square law function of the level of the stereo difference (L—R) component. As will also be apparent from the more detailed consideration of FIGS. 3 and 4 hereinafter, minimal out-of-band distortion is achieved when the amplitude level of the frequency doubled difference signal is about 13% of the amplitude level of the fundamental difference signal at full stereo modulation (i.e. with the phase modulation fundamental component modulated at 0.5 radian and with 50% AM modulation).

As will be recognized from the comparison of the manner of development of the phase modulated RF component in the system disclosed in my prior U.S. Pat. No. 3,218,393, the manner of development of an AM stereo phase modulated component as illustrated in FIG. 1 hereof is essentially different, involving in this instance phase shifting and separate frequency doubling of respective stereo related components at audio frequency. As will also be recognized from a comparison of this mode of development of an altered stereo difference signal to phase modulate a carrier in a stereo transmitter exciter as shown in FIG. 1, the utilization of phase shift and frequency doubling at audio frequency to synthesize the phase modulating wave has a very general similarity to the manner of development of the phase modulated component in a compatible single sideband signal from a single audio source as disclosed in my prior U.S. Pat. No. 3,350,645. However, in this instance the modulating signal is developed from a stereo related pair of audio input signals, separate phase shift network means and frequency doubler means are employed for each of the stereo signals, and the phase modulating audio component is composed not only of the fundamental of the stereo difference signal but includes also a controlled amount of frequency doubled difference signal, the level of the frequency doubled difference signal being substantially a square law function of the fundamental stereo difference signal and being approximately 13% of the amplitude level of the stereo difference signal at full stereo modulation.

Additional circuit differences based on the specific needs and purposes of the present invention, as illustrated in the transmitter exciter shown in FIG. 1, involve modulating the transmitted signal with an infrasonic frequency signal (e.g. 15 Hz) which serves to indicate to the receiver the presence of stereophonic intelligence in the transmitted signal. By the term "infrasonic frequency" signal is meant a signal of a frequency below the audio range, as the term is defined in the Modern Dictionary of Electronics, published by Howard W. Sams & Co. Inc. First Edition, 1962, for example.

The infrasonic frequency signal can be present either as amplitude modulation of the AM component output 18 or as frequency or phase modulation of the PM component output 84, or both. In the first instance, as shown in solid line in FIG. 1, a 15 Hz oscillator 86 provides through switch 88 an output 90 of variable amplitude, as determined by attenuator 92, which is combined with the phase shifted summation output 18. If frequency or phase modulation of the infrasonic frequency stereo presence signal is to be used either conjunctively or alternatively with the infrasonic frequency modulation input 90, this can be provided by a 15 Hz oscillator 94 the output from which is applied through switch 96 to phase modulator 76, with the result that the infrasonic phase or frequency modulation appears on the phase modulated component RF wave output 84.

In a typical transmitter exciter, involving frequency modulation of the infrasonic frequency signal, the low frequency oscillator 94 is frequency modulated by a simple narrow band FM modulator, which may take the form of a Varicap circuit across a crystal oscillator, providing an output frequency which provides the desired infrasonic frequency stereo presence signal in the receiver. In a typical instance, with the entire AM stereo wave frequency modulated at 15 Hz and to the extent of a frequency deviation of plus or minus 25 cycles, the narrow band frequency modulation of the signal does not materially effect the bandwidth of the signal nor is it detectable by listeners to AM receivers. The modulation is kept low, typically about 5 to 10% in the case of amplitude modulation of the carrier wave, or typically at less than a modulation index of one in the case of FM or PM modulation, so even if the receiver responds to the infrasonic modulation the audio system of a conventional receiver provides appreciable attenuation at 15 Hz and renders the infrasonic frequency signal inaudible or essentially so.

As will be understood, the oscillators 86 and 94 are controlled, in a manner known per se and schematically indicated by respective switches 88 and 96, to be in circuit during periods of stereophonic transmission.

As indicated, the stereo presence indication to the various receivers receiving the transmitted signal can be in the form of either infrasonic amplitude modulation or infrasonic frequency or phase modulation, or both, and can involve use of either the same infrasonic frequency tone or two infrasonic frequency tones, as desired.

FIGS. 3(A), (B) and (C) graphically illustrate the spectrum of the PM component under a typical operating condition with a stereophonic signal input. For illustration purposes the operating condition considered is the situation with only one sideband (the lower sideband LSB for example) active and at full modulation for stereo transmission (i.e. with L fundamental modulation at 0.5 radian and with no R signal). FIG. 3(A) shows the spectrum of the PM component (Bessel function distribution) at the carrier frequency ($f_c$) and at the first upper sideband (+1), second order sideband (+2) and third order sideband (+3) frequencies and at the lower first order sideband (−1), second order sideband (−2) and third order sideband (−3) frequencies at the 0.5 radian modulation level. This spectrum of frequency distribution in the output 80 from phase modulator 76 develops from the stereo difference fundamental signal input 34. FIG. 3(B) shows the phase modulation contribution of the second harmonic input at 68 with the level of the second harmonic at 0.133 of the fundamental level (i.e. at 0.0665 radian). FIG. 3(C) diagrammatically portrays the spectral frequency distribution at modulator output 80 resulting from the combined fundamental and second harmonic inputs as such appear at the output of summation circuit 32 and time delay 72, i.e. FIG. 3(C) presents a summation of FIGS. 3(A) and 3(B).

Figure 4:
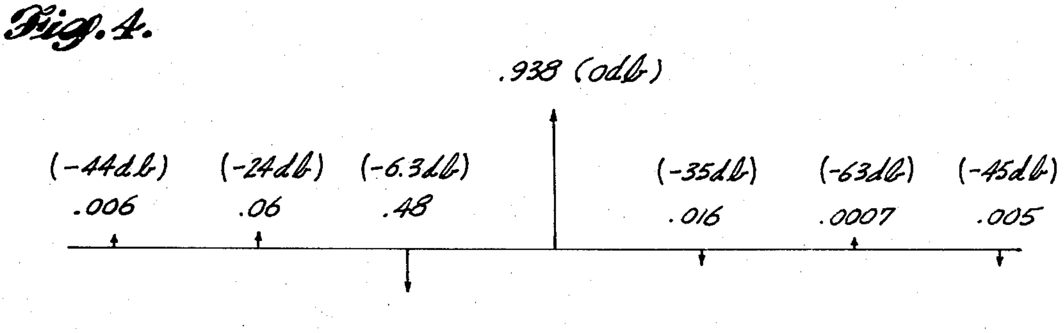
FIG. 4 is a diagrammatic showing of the final output spectrum (PM component with 50% AM modulation) corresponding to the PM component spectra shown in FIG. 3 and illustrating the transmitted output of the system of the present invention under the same condition as shown in FIGS. 3(A) – 3(C), i.e. with only the lower sideband (LSB) active.

FIG. 4 diagrammatically shows the final output spectrum, i.e. the frequency distribution of the transmitted signal resulting from the phase modulated carrier wave output 84 and the amplitude modulating L+R audio output 18 (with the latter correspondingly at full stereo modulation, i.e. at 50% AM modulation), the numerical values given in FIG. 4 also including parenthetical presentation of the relative decibel level of each sideband as compared with the carrier level. As will be noted, this output spectrum, with its values for the carrier $f_c$ and the lower first order sideband and second order sideband (−1) and (−2) closely approximates the three component transmitted signal spectrum desired for compatible single sideband transmission as set forth in my U.S. Pat. Nos. 2,989,707 and 3,350,645 and desired for compatible stereophonic transmission as set forth in my U.S. Pat. No. 3,218,393, i.e. with the stereophonic intelligence (the L signal input in this instance) appearing spectrally in the form of a somewhat reduced carrier, a first order sideband and a relatively smaller but substantial second order sideband. The output spectrum shown at FIG. 4 is also significant from the point of view that, except for the carrier frequency and first and second order lower sideband components, all other spectral components are at least −35db below the carrier level, indicating that out-of-band interference and distortion of the other stereo signal sideband (the upper sideband, containing the stereo distinguishable intelligence of the R stereo signal input) are well within commercially acceptable levels.

From the foregoing, various modifications, rearrangements and adaptations of the AM stereo transmission technique and components presented will occur to those skilled in the art to which the invention is addressed, within the scope of the following claims.

What is claimed is:

1. The method of developing a compatible AM stereophonic electromagnetic energy transmission, comprising:

a. amplitude modulating an electromagnetic carrier wave with the sum of the stereophonically related signals, and
b. phase modulating the said carrier wave with a composite stereo difference signal, said difference signal being essentially comprised of the summation of:
   1. the fundamental of the difference signal, and
   2. the difference signal developed from the second harmonics of the stereo related signals, signal (2) being about 13% of the level of signal (1) at full stereo modulation and being maintained in substantially a square law relation with respect to signal (1).

2. The method of claim 1, comprising controlling the level of said signal (2) variably in response to the syllabic rate of change in the level of signal (1).

3. The method of developing a carrier wave modulated by a stereo pair of audio signals with at least most of the stereophonically distinguishable components appearing as respective first order upper and lower sidebands of the wave, said method comprising:

generating a stereo pair of audio signals L and R, phase modulating a radio frequency wave with a stereo difference audio signal essentially comprised of the L−R fundamental and the second harmonic thereof with the amplitude of the harmonic component varying substantially as a square law function of the L−R component and being about 13% of the amplitude of the L−R component at full stereo modulation, amplitude modulating the phase modulated radio frequency wave with the L+R fundamental, maintaining the L−R and L+R modulation signals substantially in quadrature relation for modulating frequencies over at least most of the stereophonically distinguishable audio frequency spectrum, and transmitting the modulated carrier wave thus produced.

4. The method of claim 3, comprising varying the level of said second harmonic in response to the syllabic rate of change in the level of the fundamental stereo difference signal.

5. The method of transmitting a stereo pair of audio signals so as to be receivable by envelope detection type AM receiver means, comprising:

generating a stereo pair of audio signals L and R, phase modulating a radio frequency wave with a stereo difference audio signal essentially comprised of the L—R fundamental and the second harmonic thereof with the amplitude of the harmonic component varying substantially as a square law function of the L—R component and being about 13% of the amplitude of the L—R component at full stereo modulation, amplitude modulating the phase modulated radio frequency wave with the L+R fundamental, maintaining the L—R and L+R modulation signals substantially in quadrature relation for modulating frequencies over at least most of the stereophonically distinguishable audio frequency spectrum, modulating the carrier wave with an infrasonic frequency tone utilizable in a receiver to indicate that the received signal is a stereo signal, and transmitting the modulated carrier wave thus produced.

6. The method of claim 5, comprising varying the level of said second harmonic component in response to the syllabic rate of change in the level of said L—R component.

7. Transmitter means developing a carrier wave modulated by a stereo pair of audio signals with at least most of the stereophonically distinguishable components appearing as respective first order upper and lower sidebands of the wave, said transmitter means comprising:

means generating a stereo pair of audio signals L and R, means phase modulating a radio frequency wave with a stereo difference audio signal essentially comprised of the L—R fundamental and the second harmonic thereof with the amplitude of the harmonic component varying substantially as a square law function of the L—R component and being about 13% of the amplitude of the L—R component at full stereo modulation.

means amplitude modulating the phase modulated radio frequency wave with the L+R fundamental, means maintaining the L—R and L+R modulation signals substantially in quadrature relation for modulating frequencies over at least most of the stereophonically distinguishable audio frequency spectrum, and means transmitting the modulated carrier wave thus produced.

8. A transmitter according to claim 7, comprising means controlling the amplitude of said second harmonic component in response to the syllabic rate of change in amplitude of said L—R component.

9. Means for transmiting a stereo pair of audio signals so as to be receivable by envelope detection type AM receiver means, said means comprising:

means generating a stereo pair of audio signals L and R, means phase modulating a radio frequency wave with a stereo difference audio signal essentially comprised of the L—R fundamental and the second harmonic thereof with the amplitude of the harmonic component varying substantially as a square law function of the L—R component and being about 13% of the amplitude of the L—R component at full stereo modulation, means amplitude modulating the phase modulated radio frequency wave with the L+R fundamental, means maintaining the L—R and L+R modulation signals substantially in quadrature relation for modulating frequencies over at least most the stereophonically distinguishable audio frequency spectrum, means modulating the carrier wave with an infrasonic frequency tone utilizable in a receiver to indicate that the received signal is a stereo signal, and means transmitting the modulated carrier wave thus produced.

10. Means according to claim 9, comprising means controlling the amplitude of said second harmonic component in response to the syllabic rate of change in amplitude of said L—R component.

11. Means according to claim 10, comprising variable gain amplifier means controlled in response to the syllabic rate of change in the fundamental stereo difference signal amplitude and in turn controlling the amplitude of said second harmonic component.

12. Means according to claim 11, comprising rectifier means controlling the gain of said variable gain amplifier means.

13. A transmitter according to claim 9, wherein said infrasonic frequency tone is about 15 Hz.

14. A compatible AM stereophonic transmitter, comprising:

a. means generating a stereo pair of audio signals;
b. means generating a radio frequency carrier wave;
c. means selecting a summation of said two stereo signals as a stereo summation signal;
d. means selecting the difference between said two stereo signals as a stereo difference signal;
e. phase shift network means deriving a fundamental output from the stereo difference signal;
f. separate phase shift network means and frequency doubler means for each said stereo signals;
g. means deriving a frequency doubled difference signal from the separate, frequency doubled signals;
h. variable gain amplifier means controlled in response to the amplitude level of the fundamental of the stereo difference signal and amplifying the frequency doubled difference signal substantially as a square law function of the fundamental stereo difference signal and at a level providing a second harmonic output having an amplitude level about 13% of the amplitude level of the stereo difference signal at full stereo modulation;
i. means combining the phase shifted fundamental difference signal and such second harmonic output to provide an altered stereo difference signal;
j. means phase modulating said radio frequency carrier wave with said altered stereo difference signal;
k. means amplitude modulating the phase modulated radio frequency carrier wave with the stereo summation signal, and
l. means radiating the radio frequency wave thus modulated.

15. A transmitter according to claim 14, wherein said frequency doubler means are each of the constant gain type.

16. A transmitter according to claim 14, wherein the gain of said variable gain amplifier means is controlled by rectifier means.

17. A transmitter according to claim 14, wherein said variable gain amplifier means is controlled in response to the changes in fundamental stereo difference signal level at a syllabic rate.

18. A transmitter according to claim 14, further comprising means modulating the radio frequency carrier wave with an infrasonic frequency tone usable in a receiver receiving the transmitted carrier wave to indicate that the received signal is a signal modulated with stereo intelligence and/or to control receiver output mode.

19. A transmitter according to claim 18, wherein said infrasonic frequency tone is about 15 Hz.

* * * * *